(12) United States Patent
Tsuguma

(10) Patent No.: US 10,921,841 B2
(45) Date of Patent: Feb. 16, 2021

(54) VEHICLE OPERATION PEDAL DEVICE

(71) Applicant: TOYODA IRON WORKS CO., LTD., Toyota (JP)

(72) Inventor: Tomohiro Tsuguma, Toyota (JP)

(73) Assignee: TOYODA IRON WORKS CO., LTD., Toyota (JP)

( * ) Notice: Subject to any disclaimer, the term of this patent is extended or adjusted under 35 U.S.C. 154(b) by 0 days.

(21) Appl. No.: 16/852,641

(22) Filed: Apr. 20, 2020

(65) Prior Publication Data

US 2020/0241587 A1    Jul. 30, 2020

Related U.S. Application Data

(63) Continuation of application No. PCT/JP2018/032819, filed on Sep. 5, 2018.

(30) Foreign Application Priority Data

Nov. 10, 2017    (JP) ................. 2017-217139

(51) Int. Cl.
*G05G 1/30*      (2008.04)
*B60T 7/06*      (2006.01)
(Continued)

(52) U.S. Cl.
CPC ............. *G05G 1/327* (2013.01); *B60R 21/09* (2013.01); *B60K 26/02* (2013.01); *B60T 7/065* (2013.01)

(58) Field of Classification Search
CPC ............ G05G 1/30; G05G 1/32; G05G 1/323; G05G 1/327; G05G 1/44; G05G 1/445;
(Continued)

(56) References Cited

U.S. PATENT DOCUMENTS

| | | | | | |
|---|---|---|---|---|---|
| 5,983,746 | A | * | 11/1999 | Nawata | .................... B60R 21/09 |
| | | | | | 180/274 |
| 8,479,866 | B2 | * | 7/2013 | Tokumo | ................. G05G 1/327 |
| | | | | | 180/274 |

(Continued)

FOREIGN PATENT DOCUMENTS

| | | |
|---|---|---|
| JP | H09-286256 A | 11/1997 |
| JP | H11-139346 A | 5/1999 |

(Continued)

OTHER PUBLICATIONS

Nov. 20, 2018 International Search Report issued in International Patent Application No. PCT/JP2018/032819.

*Primary Examiner* — Adam D Rogers
(74) *Attorney, Agent, or Firm* — Oliff PLC

(57) ABSTRACT

Provided is a vehicle operation pedal device comprising: an operation pedal provided with a depressing part; a pair of upper support members anchored to a dash panel; a pair of lower support members anchored to the dash panel and also anchored to the pair of upper support members; an upper center support member bridging the pair of upper support members; and a connection hole for rotatably supporting, relative to the operation pedal, an operating rod protruding from the dash panel toward a vehicle rear side. The upper center support member comprises a sliding receiving part. The pair of upper support members comprise escape holes.

8 Claims, 10 Drawing Sheets

(51) Int. Cl.
*B60K 26/02* (2006.01)
*G05G 1/327* (2008.04)
*B60R 21/09* (2006.01)

(58) Field of Classification Search
CPC ......... B60K 23/02; B60K 26/02; B60T 7/065; B60R 21/09
See application file for complete search history.

(56) References Cited

U.S. PATENT DOCUMENTS

| | | | |
|---|---|---|---|
| 9,889,826 B2 * | 2/2018 | Periasamy | G05G 1/327 |
| 9,981,638 B2 | 5/2018 | Kawazu et al. | |
| 2007/0266815 A1 * | 11/2007 | Johansson | G05G 1/30 74/512 |
| 2017/0050625 A1 | 2/2017 | Kawazu et al. | |

FOREIGN PATENT DOCUMENTS

| | | | | |
|---|---|---|---|---|
| JP | 2001-47986 A | | 2/2001 | |
| JP | 3165385 B2 | | 5/2001 | |
| JP | 3790068 B2 | | 6/2006 | |
| JP | 2017-041102 A | | 2/2017 | |
| JP | 2017102546 A | * | 6/2017 | |
| WO | WO-2020012696 A1 | * | 1/2020 | ............. B62D 25/08 |

\* cited by examiner

FIG. 10
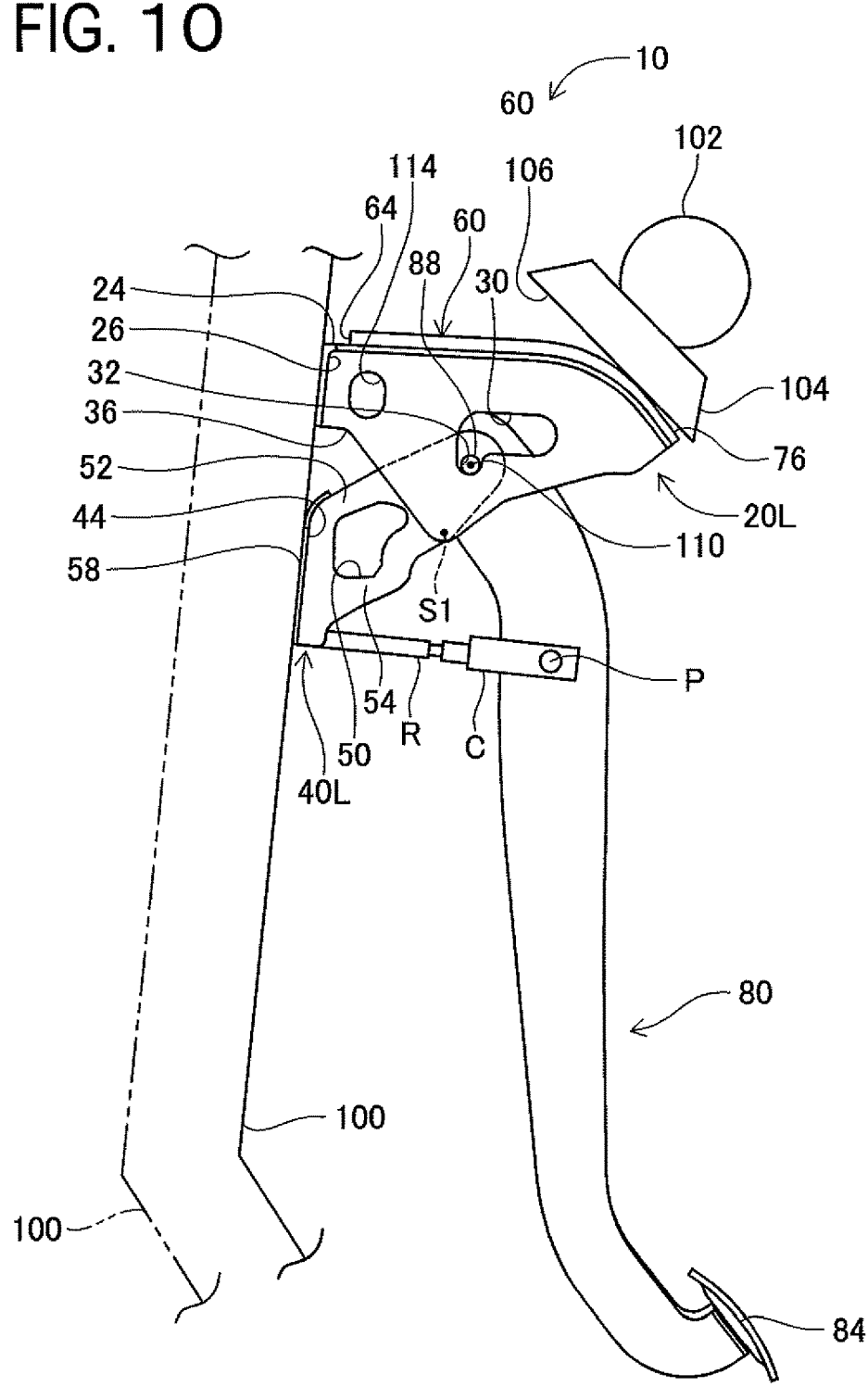
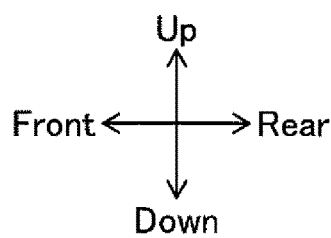

VEHICLE OPERATION PEDAL DEVICE

CROSS-REFERENCE TO RELATED APPLICATION

This application is based upon and claims the benefit of priority of the prior Japanese Patent Application No. 2017-217139, filed on Nov. 10, 2017, the entire contents of which are incorporated herein by reference.

FIELD

The present disclosure relates to a vehicle operation pedal device that prevents a depressing part of an operation pedal from moving rearward to a vehicle rear side when vehicle component members are displaced toward the vehicle rear side due to vehicle collision (hereinafter, referred to as "preventing the depressing part of the operation pedal from moving rearward at the time of vehicle collision").

BACKGROUND

Conventionally, various techniques have been suggested for a vehicle operation pedal device that prevents a depressing part of an operation pedal from moving rearward at a time of vehicle collision.

For example, a vehicle pedal device disclosed in Japanese Laid-open Patent Publication No. 2017-41102 includes a pedal bracket fixed on a rear surface of a dash panel forming a part of a body shell of a vehicle; a pedal extending in a vehicle width direction and rotatably supported around a shaft positioned on a rear side relative to the fixing part to the dash panel of the pedal bracket in the pedal bracket; a lever bracket fixed to the dash panel and separated from the pedal bracket; a fixing means for fixing the pedal bracket to the lever bracket with a prescribed fixing and holding force and releasing the fixation of the pedal bracket and the lever bracket when the pedal bracket receives a force exceeding the fixing and holding force in a direction where the pedal bracket relatively moves downward with respect to the lever bracket; a rotation lever rotatably supported around a rotation shaft extending in the lever bracket in the vehicle width direction; an instrument panel reinforcement fixed to the body shell and supporting an instrument panel; a lever rotation means fixed to the instrument panel reinforcement and rotates the rotation lever by making contact with the rotation lever from the rear side when the lever bracket moves rearward along with the dash panel; a bracket deformation means fixed to the instrument panel reinforcement and deforms the pedal bracket downward by making contact with the pedal bracket from the rear side when the pedal bracket moves rearward along with the dash panel, wherein the vehicle pedal device further includes a pressing part that can press the fixing means or the pedal bracket downward with the force exceeding the fixing and holding force when the rotation lever is rotated by the lever rotation means.

In this structure, the pedal bracket is fixed to the dash panel by fixing the pedal bracket and the lever bracket fixed to the pedal bracket with prescribed the fixing and holding force to the dash panel. A strength of mounting the pedal bracket to the dash panel can be sufficiently large since the pedal bracket is fixed to the dash panel at two places as described above.

And, there are various directions of components of a force generated in a vehicle due to an actual collision. For example, when not only rearward components but also a lot of lateral components are included, the dash panel is deformed not only in the rearward direction but also in the lateral direction. However, even if the dash panel is deformed in any direction, the pedal bracket and the lever bracket (and the rotation lever) fixed to the dash panel substantially move in the same direction. In other words, a moving direction of the pedal bracket and moving directions of the lever bracket and the rotation lever do not greatly differ from each other when the dash panel is deformed. Accordingly, even when the dash panel is deformed in different directions due to the collision, generation of a twist in the fixing part (fixing means) between the pedal bracket and the lever bracket is prevented. Therefore, even if the dash panel is deformed in any direction, the pedal bracket can be separated from the lever bracket. In other words, the pedal can be relatively moved to a front side with respect to the dash panel regardless of the deformation direction of the dash panel.

SUMMARY

According to an aspect of the embodiments, a vehicle operation pedal device includes: an operation pedal provided with a boss at an upper end part and further provided with a depressing part at a lower end part, the depressing part to be stepped on to a vehicle front side; a pair of upper support members fixed to a first vehicle component member disposed on the vehicle front side relative to the operation pedal and received a load acting on the boss of the operation pedal at a stepping operation at both sides of the operation pedal in a vehicle width direction by stepping on the depressing part of the operation pedal to the vehicle front side at a normal time; a pair of lower support members fixed to the first vehicle component member and further fixed to the pair of upper support members at the both sides of the operation pedal in the vehicle width direction, the pair of lower support members configured to be rotatably supported the boss of the operation pedal while receiving the load at the stepping operation at the both sides of the operation pedal in the vehicle width direction and further configured to be a weaker strength than the pair of upper support members; an upper center support member laid between upper end parts of the pair of upper support members; and a support part pivotably supporting a tip part of an operating rod protruded toward a vehicle rear side from the first vehicle component member with respect to the operation pedal between the upper end part and the lower end part of the operation pedal, wherein the upper center support member includes a sliding receiving part configured to be faced a sliding surface provided so as to incline toward a vehicle lower side as it goes toward the vehicle rear side in a second vehicle component member disposed on the vehicle rear side relative to the first vehicle component member, and wherein the pair of upper support members includes an escape hole for which the boss of the operation pedal is led to the vehicle rear side in response to being guided the sliding receiving part of the upper center support member by sliding on the sliding surface of the second vehicle component member and buckling deformation of the pair of lower support members when the first vehicle component member is displaced toward the vehicle rear side at a time of vehicle collision, and wherein the boss of the operation pedal pivots toward the vehicle lower side around the support part while moving to the vehicle rear side when the first vehicle component member is displaced toward the vehicle rear side at the time of vehicle collision.

The object and advantages of the invention will be realized and attained by means of the elements and combinations particularly pointed out in the claims.

It is to be understood that both the forgoing general description and the following detailed description are exemplary and explanatory and are not restrictive of the invention.

BRIEF DESCRIPTION OF DRAWINGS

FIG. 10 is a side view illustrating a variation of the configuration of the vehicle operation pedal device.

DESCRIPTION OF EMBODIMENTS

Figure 1:
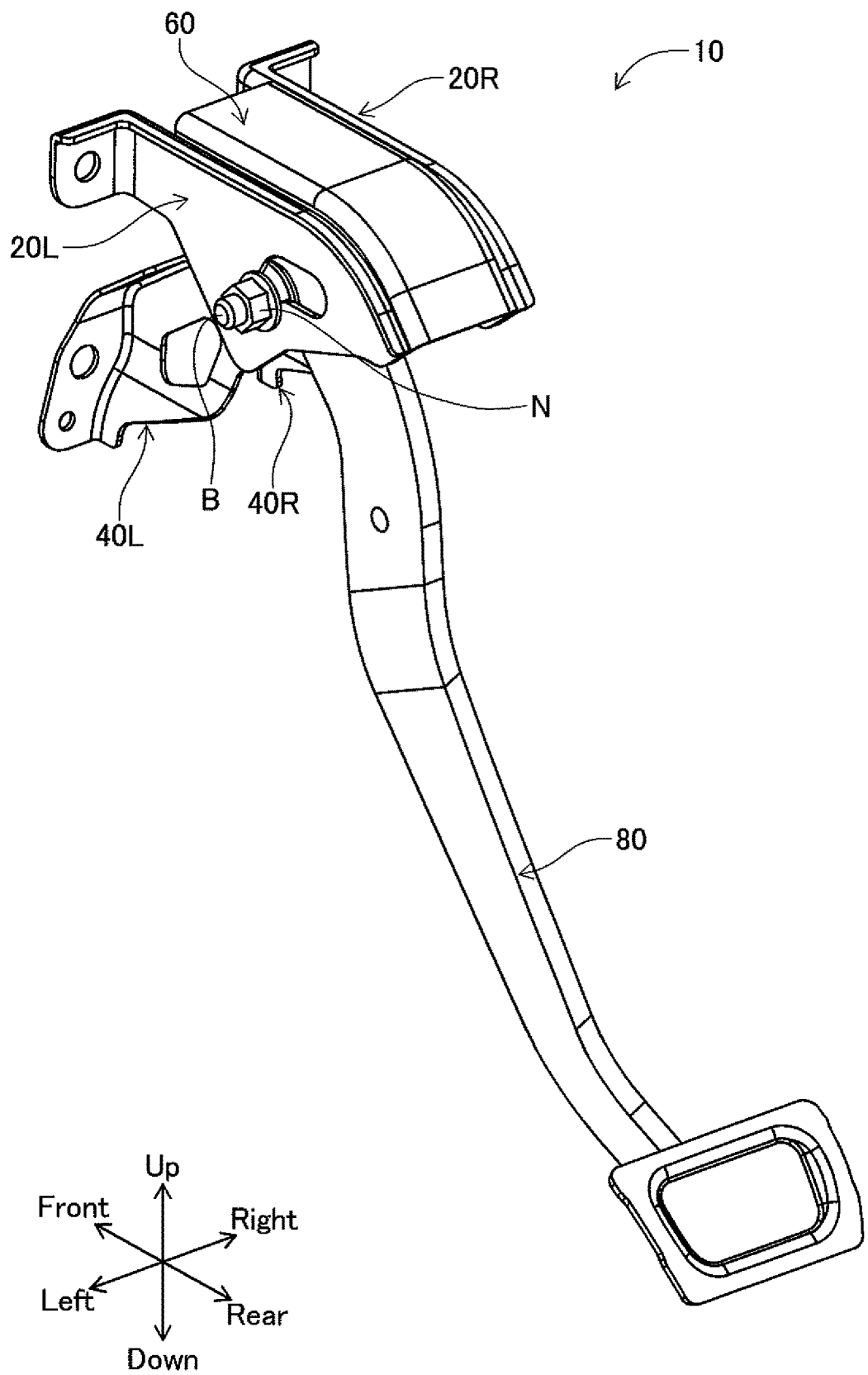
FIG. 1 is a perspective view illustrating a configuration of a vehicle operation pedal device according to a present embodiment.

In an above-mentioned conventional technique, a lot of parts are needful to separate the pedal bracket from the lever bracket, and further it is needful to secure a large mounting space in a vehicle vertical direction since those parts are arranged on an upper side of the pedal bracket.

The present disclosure is made in order to solve the above-mentioned respect in the conventional technique, and a problem thereof is to provide a vehicle operation pedal device, wherein mounting to a vehicle is completed by being fixed to a first vehicle component member disposed on a vehicle front side relative to an operation pedal, and wherein the number of parts needful to prevent a depressing part of the operation pedal from moving rearward at a time of vehicle collision are small, and a mounting space in a vehicle vertical direction is small.

Hereinafter, a vehicle operation pedal device according to the present disclosure will be described with reference to drawings and based on the present embodiment concreted. In each of the drawings used for an explanation below, a part of the basic configuration is omitted, and a dimensional ratio etc. of each part illustrated in the drawings is not necessarily accurate.

In each drawing, a front-and-rear direction, an up-and-down direction, and a left-and-right direction are as described in the each drawing. However, in FIG. 4, a back side of a paper surface in the drawing is a front direction while the front side of the paper surface in the drawing is the rear direction. In FIGS. 5 to 10, a back side of a paper surface in the each drawing is the right direction while a front side of the paper surface in the each drawing is the left direction.

Incidentally, in the below explanation, the front direction, the rear direction, the up direction, and the down direction may be referred to as "the vehicle front side", "the vehicle rear side", "the vehicle upper side", and "the vehicle lower side", respectively. And, the left-and-right direction may be referred to as "the both sides in the vehicle width direction".

(1) Outline of the Vehicle Operation Pedal Device

As illustrated in FIG. 1, a vehicle operation pedal device 10 according to the present embodiment is made of a metal, and includes a pair of upper support members 20L, 20R, a pair of lower support members 40L, 40R, an upper center support member 60, and an operation pedal 80. The operation pedal 80 has an upper end part pivotably supported by a rotation bolt B and a nut N.

Incidentally, in the below explanation below, when the pair of upper support members 20L, 20R is generally explained without differentiation, it is referred to as "an upper support member 20". In this regard, the above is also applied to the pair of lower support members 40L, 40R.

Figure 2:
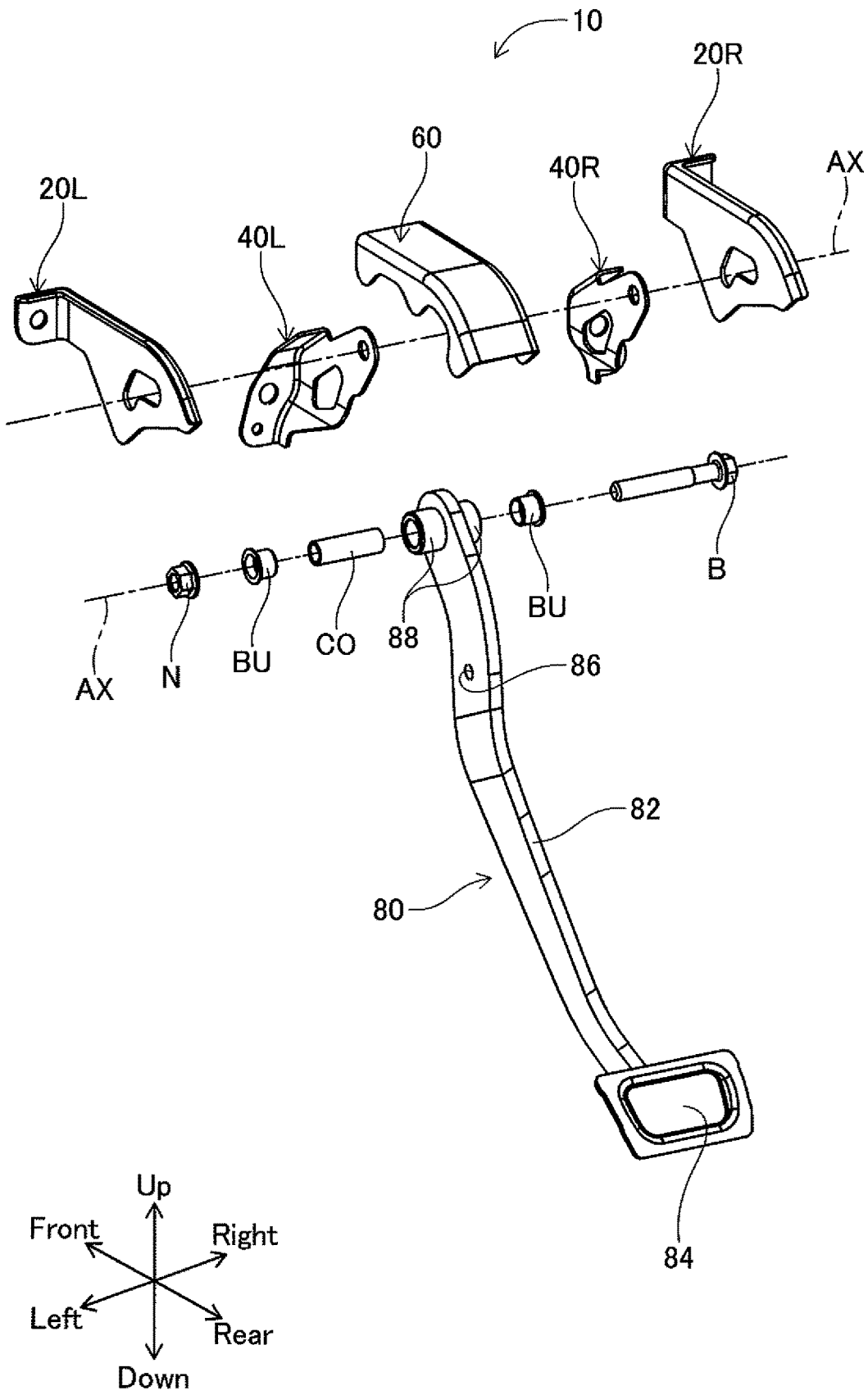
FIG. 2 is an exploded perspective view illustrating the configuration of the vehicle operation pedal device.

As illustrated in FIG. 2, the operation pedal 80 includes a pedal arm 82. A depressing part 84 is provided at a lower end part of the pedal arm 82. Between an upper end part and the lower end part of the pedal arm 82, a connection hole 86 is provided in a state of passing through the pedal arm 82 in the left-and-right direction. At the upper end part of the pedal arm 82, a boss 88 is fixed to the pedal arm 82 by welding in a state of passing through the pedal arm 82 in the left-and-right direction. Although the pedal arm 82 is a thick plate structure, it may be a thin plate hollow structure.

A collar CO is inserted into the boss 88 of the operation pedal 80 that is in a state into which a pair of bushes BU is fitted from left and right ends thereof. Thereby, a cylindrical part of the each bush BU is provided between the boss 88 and the collar CO. The boss 88 in a state as described above is rotatably supported by the rotation bolt B and the nut N with respect to the pair of upper support members 20L, 20R and the pair of lower support members 40L, 40R as described later. Thereby, the boss 88 (provided at the upper end part of the operation pedal 80) rotates with an axis AX as a rotation axis. Incidentally, the axis AX is positioned on a lower side of the upper center support member 60.

Figure 3:
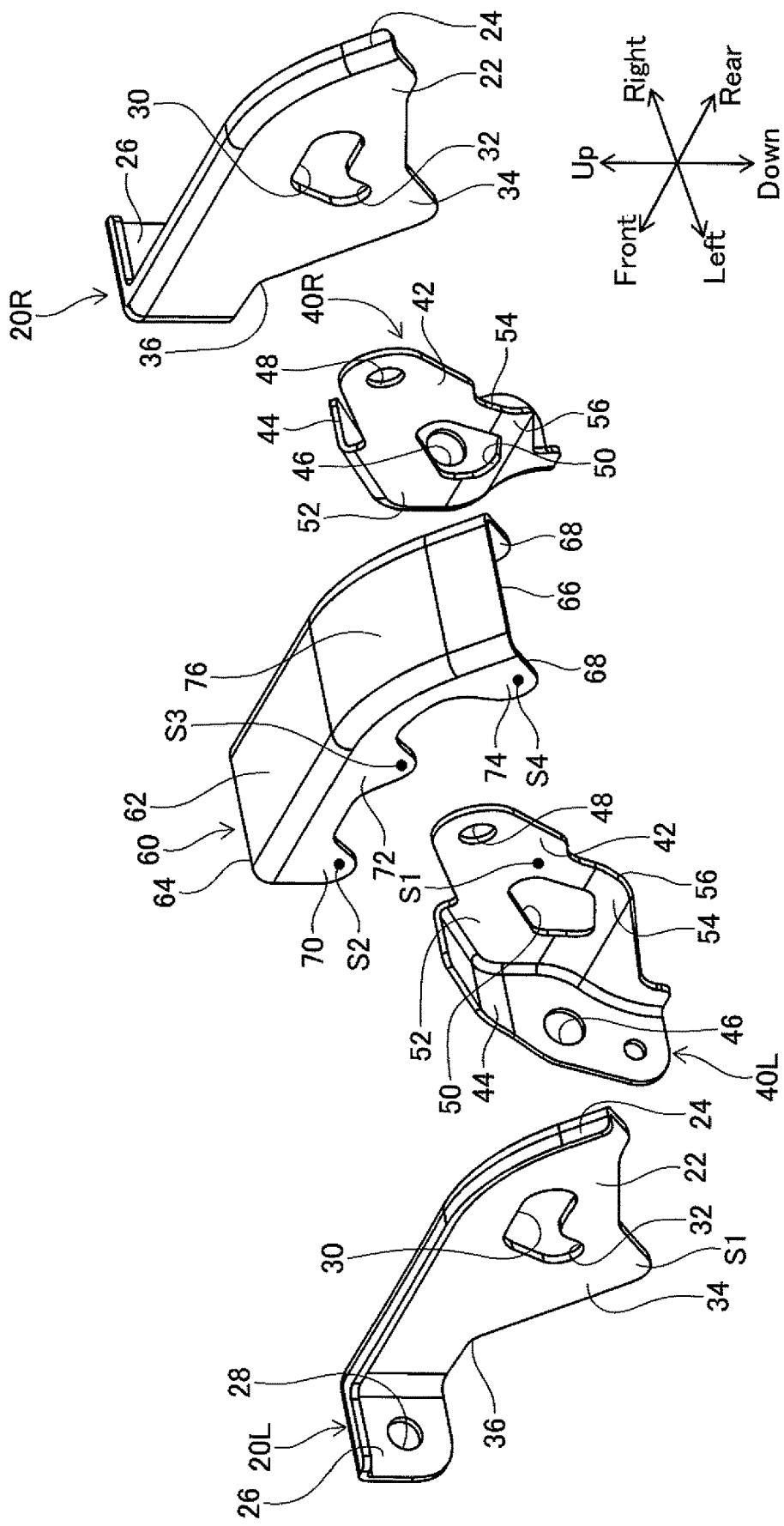
FIG. 3 is an exploded perspective view illustrating a part of the vehicle operation pedal device.

Next, the pair of upper support members 20L, 20R will be explained. As illustrated in FIG. 3, of the pair of upper support members 20L, 20R, the upper support member 20L on the left side is arranged on a left side (i.e. on an outside) of the upper center support member 60, while the upper support member 20R on the right side is arranged on a right side (i.e. on the outside) of the upper center support member 60. Further, the pair of upper support members 20L, 20R has a symmetrical outer shape in the left-and-right direction.

Therefor, the upper support member 20L on the left side will be explained below, and the detailed explanation on the upper support member 20R on the right side will be omitted by giving the same reference signs parts substantially in common with those of the upper support member 20L on the left side.

The upper support member 20L includes a plate-shaped body 22. An upper end part of the body 22 is formed with a flange part 24 protruding in the left direction (i.e. to an outside). A front end part of the body 22 is formed with a mounting part 26 bent in the left direction (i.e. to the outside). A mounting hole 28 is provided at a substantial center of the mounting part 26 in a state where the mounting hole 28 penetrates through the mounting part 26 in the front-and-rear direction. And, the body 22 is provided with an escape hole 30 near a rear side of the body 22 in a state where the escape hole 30 penetrates through the body 22 in the left-and-right direction. A stopper part 32 having a part of a peripheral edge of the escape hole 30 protruded the down direction is formed at a front peripheral edge of the escape hole 30. Thereby, the escape hole 30 is formed into a substantial L shape when viewed from the left-and-right direction. Further, the body 22 is formed with a protrusion part 34 having a lower edge of the body 22 protruded the down direction. Thereby, a bent part 36 having the lower edge of the body 22 directed to the down direction as it goes toward the rear direction is formed between the mounting part 26 and the protrusion part 34. Incidentally, the protrusion part 34 is spot-welded to the lower support member 40L on the left side at a spot welding point S1.

Next, the pair of lower support members 40L, 40R will be explained below. OF the pair of lower support members 40L, 40R, the lower support member 40L on the left side is arranged on a right side of the upper support member 20L (i.e. on an inside) while the lower support member 40R on the right side is arranged on a left side of the upper support member 20R (i.e. on an inside). Further, the pair of lower support members 40L, 40R has a symmetrical outer shape in the left-and-right direction.

Therefor, the lower support member 40L on the left side will be explained below, and the detailed explanation on the lower support member 40R on the right side will be omitted by giving the same reference signs parts substantially in common with those of the lower support member 40L on the left side.

The lower support member 40L includes a plate-shaped body 42. A mounting part 44 having an end part of the body 42 bent in the left direction (i.e. to an outside) is formed from a center at an upper end part to a front end part of the body 42. A mounting hole 46 is provided at a substantial center of the mounting part 44 in a state where the mounting hole 46 penetrates through the mounting part 44 in the left-and-right direction. A rotation hole 48 is provided at a rear end part of the body 42 in a state where the rotation hole 48 penetrates through the body 42 in the left-and-right direction. An opening part 50 is provided at a substantial center of the body 42 in a state where the opening part 50 penetrates through the body 42 in the left-and-right direction. Thereby, an upper strong part 52 is provided from an upper peripheral edge of the opening part 50 to the mounting part 44. Further, a lower weak part 54 including the opening part 50 is provided from the upper peripheral edge of the opening part 50 to a lower edge of the body 42.

The upper strong part 52 is in a state of being connected to the mounting part 44 formed by bending the end part of the body 42 in the left direction (i.e. to the outside).

And, plate thickness of the body 42 of the pair of lower support members 40L, 40R is thinner than thickness of the body 22 of the pair of upper support members 20L, 20R. Thus, the pair of lower support members 40L, 40R has a weaker strength than the pair of upper support members 20L, 20R.

Next, the upper center support member 60 will be explained below. The upper center support member 60 includes a plate-shaped body 62. Bent parts 68, 68 formed by bending an end part of the body 62 to the down direction are formed from a front end 64 to a rear end 66 of the body 62 on left and right sides of the body 62. The bent part 68 on a left side is formed with three protrusion parts 70, 72, 74 protruded from a lower edge of the bent part 68 to the down direction. Each of the protrusion parts 70, 72, 74 is spot-welded to an upper end part of the upper support member 20L on the left side at each of spot welding points S2, S3, and S4. This is the same for the bent part 68 on the right side, the bent part 68 on the right side is spot-welded to the upper support member 20R on the right side. Thereby, the upper center support member 60 is laid between the upper end parts of the pair of upper support members 20L, 20R. Further, the body 62 is formed with a sliding receiving part 76 from a substantial center to the rear end 66 of the body 62. The sliding receiving part 76 is an inclined surface bent downward as it goes toward the rear side.

As described above, the pair of upper support members 20L, 20R, the pair of lower support members 40L, 40R, and the upper center support member 60 are integrated by the spot-welding at the each of the spot welding points S2, S3, and S4.

At the time of integration, the spot welding point S1 is positioned in the left-and-right direction of the operation pedal 80. Thereby, the each of lower support members 40L, 40R is fixed to the each of upper support members 20L, 20R in the left-and-right direction of the operation pedal 80. Incidentally, the spot welding point S1 is at a position adjacent to the lower weak part 54 from the upper center support member 60 side (i.e. an upper side) in the each of lower support members 40L, 40R.

And, an upper surface of the body 62 of the upper center support member 60 (including the sliding receiving part 76) is arranged in the up direction relative to the upper end of the each of upper support members 20L, 20R. And, the front end 64 of the upper center support member 60 is arranged in the rear direction relative to the mounting part 26 of the each of upper support members 20L, 20R and in the up direction of the bent part 36 of the each of upper support members 20L, 20R. Thereby, the bent part 36 of the each of upper support members 20L, 20R is arranged at a position directed from the front end 64 of the upper center support member 60 to down direction.

Further, the stopper part 32 of the escape hole 30 of the each of upper support members 20L, 20R is adjacent to the rotation hole 48 of the each of lower support members 40L, 40R inside thereof. Accordingly, when the boss 88 of the operation pedal 80 is interposed between the rotation holes 48 of the each of lower support members 40L, 40R, the stopper parts 32 of the escape holes 30 of the each of upper support members 20L, 20R and the rotation holes 48 of the each of lower support members 40L, 40R are in a state of being communicated with each other in the left-and-right direction via the collar CO inside the boss 88. In a situation as described above, the rotation bolt B is inserted to the stopper part 32 of the upper support member 20L on the left side from the stopper part 32 of the upper support member 20R on the right side via the rotation hole 48 of the lower support member 40R on the right side, the collar CO inside the boss 88, and the rotation hole 48 of the lower support member 40L on the left side.

Figure 4:
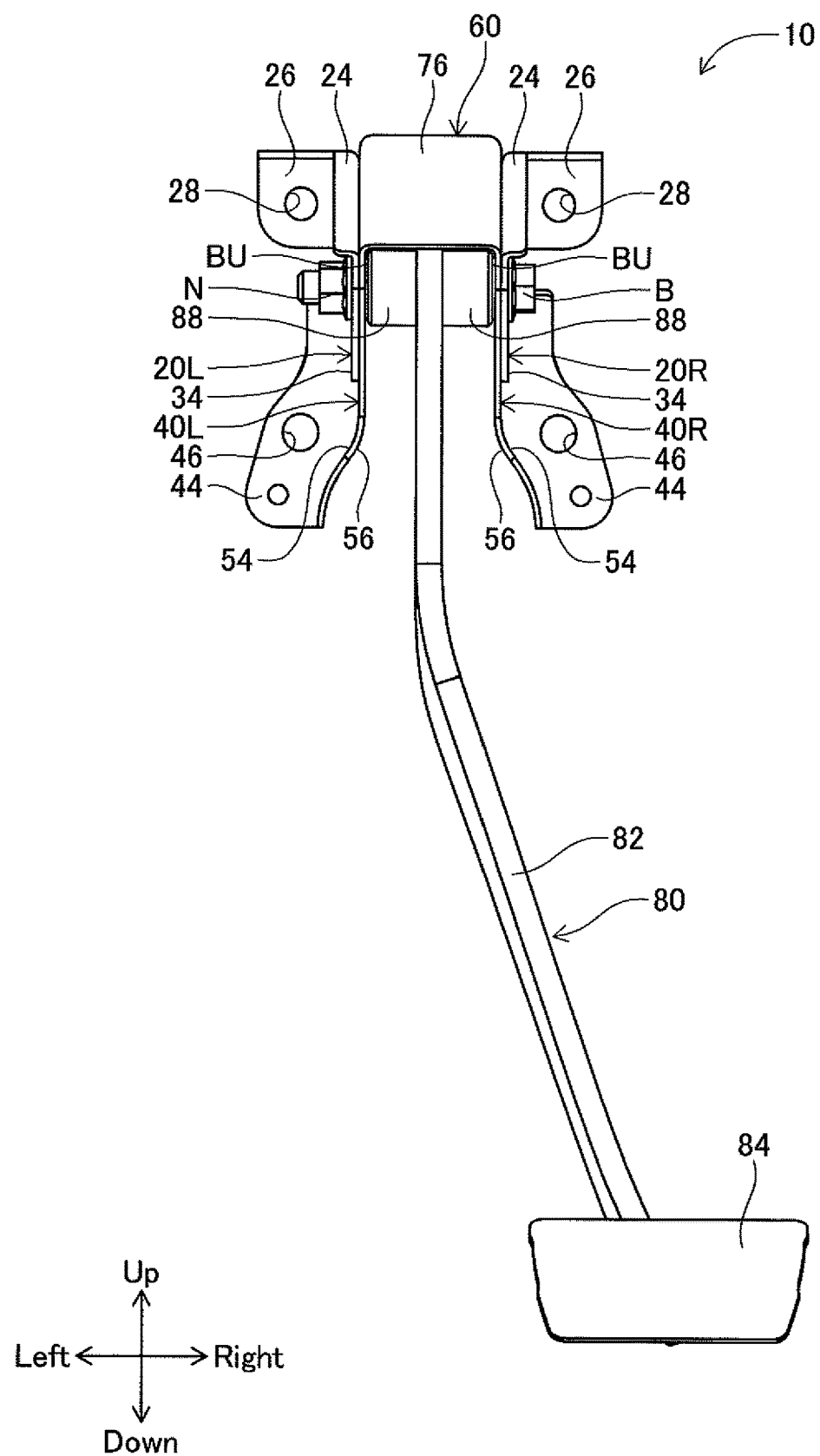
FIG. 4 is a front view illustrating the configuration of the vehicle operation pedal device.

And then, as illustrated in FIG. 4, a head part of the rotation bolt B is abutted with the upper support member 20R on the right side. In contrast, in the upper support member 20L on the left side, a tip part of the rotation bolt B is protruded in the left direction, and the nut N is screwed into the protruded part. Thereby, since the left and right ends of the collar CO are sandwiched between the each of lower support members 40L, 40R, a distance between (the rotation holes 48 of) the each of lower support members 40L, 40R in the left-and-right direction is kept fixed. Further, a circular flange part of the each bush BU is provided between the boss 88 and the each of the lower support members 40L, 40R, at left and right ends of the boss 88.

As described above, the boss 88 at the upper end part of the pedal arm 82 is rotatably supported in (the rotation holes 48 of) the each of lower support members 40L, 40R, and the operation pedal 80 is pivoted around the collar CO and the rotation bolt B when the depressing part 84 at the lower end part of the pedal arm 82 is stepped on to the front direction. At the time of the rotation, the boss 88 of the operation pedal 80 is held by the stopper parts 32 of the escape holes 30 of the each of upper support members 20L, 20R via the rotation bole B and the nut N. At that time, the rotation bolt B is in a state of being engaged by the stopper parts 32 of the escape holes 30 of the pair of upper support members 20L, 20R.

Incidentally, the lower support member 40L is formed in a round part 56 having a curved surface of that a plate shaped part of the lower weak part 54 is protruded in the right direction (i.e. inside). Likewise, the lower support member 40R is formed in a round part 56 having a curved surface formed of a plate shaped part of the lower weak part 54 is protruded in the left direction (i.e. inside).

(2) Fixation of the Vehicle Operation Pedal Device

Figure 5:
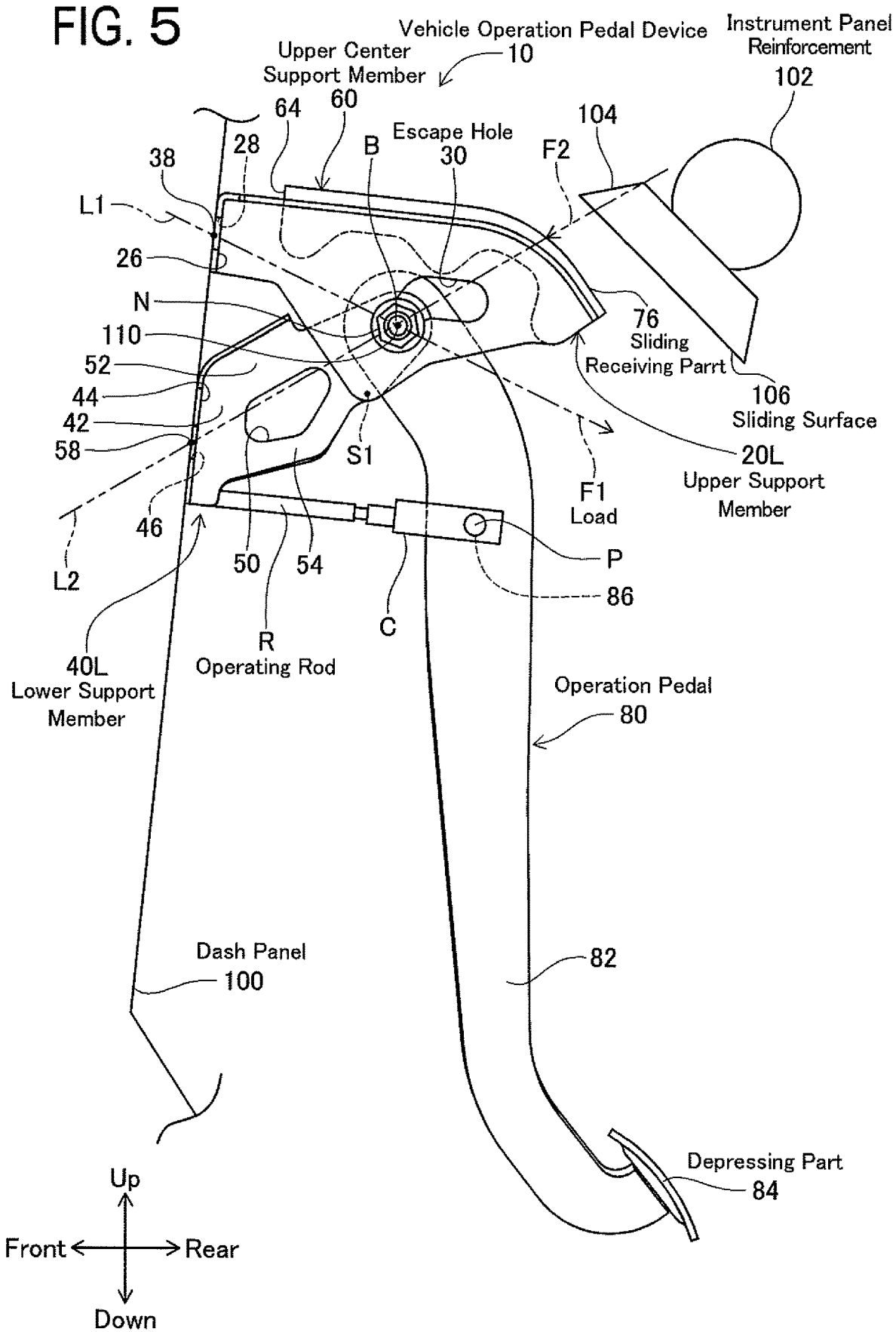
FIG. 5 is a side view illustrating the configuration of the vehicle operation pedal device at a normal time.

As illustrated in FIG. 5, the vehicle operation pedal device 10 according to the present embodiment is fixed to a dash panel 100. In order to fix the vehicle operation pedal device 10 to the dash panel 100, the mounting part 26 of the upper support member 20 is in a state of being abutted with the dash panel 100, and a fixing bolt (not illustrated) is inserted into the mounting hole 28 of the mounting part 26. Hereinafter, the inserted position is referred to as an upper fixed point 38. Further, the mounting part 44 of the lower support member 40 is in a state of being abutted with the dash panel 100, and a fixing bolt (not illustrated) is inserted into the mounting hole 46 of the mounting part 44. Hereinafter, the inserted position is referred to as a lower fixed point 58.

As described above, the upper support member 20 and the lower support member 40 are fastened to the dash panel 100 by a bolt. At that time, the front end 64 of the upper center support member 60 is disposed to the rear side relative to the dash panel 100. Incidentally, the upper support member 20 and the lower support member 40 may be fastened to the dash panel 100 by a bolt via a collar to absorb vibration sound etc.

The dash panel 100 corresponds to a part of a vehicle and is disposed in the front direction relative to the operation pedal 80. The vehicle includes an instrument panel reinforcement 102 and a bracket for collision 104 etc. in addition to the dash panel 100. The instrument panel reinforcement 102 is disposed to the vehicle rear side relative to the dash panel 100. The bracket for collision 104 is fixed from a front end part to a lower end part of the instrument panel reinforcement 102. A sliding surface 106 is formed at a front end of the bracket for collision 104. The sliding surface 106 is inclined to the vehicle lower side as it goes toward the vehicle rear side and faces the sliding receiving part 76 of the upper center support member 60.

A tip part of an operating rod R is pivotably supported to the operation pedal 80 via a connection pin P and a clevis C between the upper end part and the lower end part of the operation pedal 80. The operating rod R is protruded from a master cylinder (not illustrated) on the dash panel 100 side to the rear direction. Incidentally, the connection pin P is attached by inserting into the connection hole 86 of the pedal arm 82 and the clevis C.

When the depressing part 84 of the operation pedal 80 is stepped on to the vehicle front side, a load F1 acts on the rotation bolt B via the boss 88 of the operation pedal 80 (see FIG. 2). And then, the upper fixed point 38 is positioned on a first straight line L1 extended from a start point of a vector indicating the load F1 (i.e. a rotational center point 110 of the rotation bolt B and the nut N) to an opposite side to the direction of the vector. Namely, the first straight line L1 is a line connecting the rotational center point 110 of the rotation bolt B (i.e. the boss 88 of the operation pedal 80 etc.) to the upper fixed point 38 when viewed from a vertical direction (i.e. left-and-right direction) to a paper surface of FIG. 5.

In contrast, when the sliding receiving part 76 of the upper center support member 60 abuts on the sliding surface 106 of the instrument panel reinforcement 102 by displacing the dash panel 100 to the vehicle rear side, a reaction force F2 from the sliding surface 106 of the instrument panel reinforcement 102 acts on the sliding receiving part 76 of the upper center support member 60. And then, the rotational center point 110 such as the rotation bolt B etc. and the lower fixed point 58 are positioned on a second straight line L2 extended to the direction of the vector indicating the reaction force F2. Namely, the second straight line L2 is a line connecting the rotational center point 110 of the rotation bolt B (i.e. the boss 88 of the operation pedal 80 etc.) to the lower fixed point 58 when viewed from the vertical direction (i.e. left-and-right direction) to the paper surface of FIG. 5.

Incidentally, the direction of the vector indicating the reaction force F2 can be adjusted depending on a distance from the upper end of each of the upper support members 20L, 20R to the upper surface of the body 62 of the upper center support member 60 (including the sliding receiving part 76) when the upper support member 20, the lower support member 40, and the upper center support member 60 are integrated with each other.

Further, the opening part 50 of the lower support member 40 is positioned on the second straight line L2 when viewed from the vertical direction (i.e. left-and-right direction) to the paper surface of FIG. 5. Thus, the upper strong part 52 of the lower support member 40 is arranged on the vehicle upper side relative to the second straight line L2 while the lower weak part 54 of the lower support member 40 is arranged on the vehicle lower side relative to the second straight line L2.

Also, the lower support member 40 is fixed to the upper support member 20 at the spot welding point S1 adjacent to the lower weak part 54 from a side where the sliding receiving part 76 of the upper center support member 60 receives the reaction force F2.

Incidentally, the rotational center point 110 of the rotation bolt B (i.e. the boss 88 of the operation pedal 80 etc.) corresponds to a point where the axis AX (see FIG. 2) parallel to the vertical direction (i.e. the left-and-right direction) to the paper surface of FIG. 5 intersects with a left and right side end surface of the rotation bolt B.

As described in detail above, in the vehicle operation pedal device 10 according to the present embodiment, the pair of upper support members 20L, 20R and the pair of lower support members 40L, 40R are fixed to the dash panel 100 disposed on the vehicle front side relative to the operation pedal 80. The upper center support member 60 is laid between the upper end parts of the pair of upper support members 20L, 20R. On the both sides of the operation pedal 80 in the vehicle width direction, the pair of lower support members 40L, 40R is fixed to the pair of upper support members 20L, 20R. Further, at the pair of lower support members 40L, 40R, the boss 88 provided at the upper end part of the pedal arm 82 of the operation pedal 80 is rotatably supported to suspend the depressing part 84 provided at the lower end part of the pedal arm 82 of the operation pedal 80. As described above, the vehicle operation pedal device 10 according to the present embodiment is supported by only the dash panel 100 out of members forming a vehicle.

Accordingly, the vehicle operation pedal device 10 according to the present embodiment is fixed to the dash panel 100 disposed on the vehicle front side relative to the operation pedal 80, thereby completing mounting to the vehicle.

Incidentally, in the lower weak part 54 of the pair of lower support members 40L, 40R, a width in the up-and-down direction from a lower peripheral edge of the opening part 50 to the lower edge of the body 42 is narrower than a width in the up-and-down direction of the upper strong part 52. Further, the upper strong part 52 is in a state of being connected to the mounting part 44 formed by bending the end part of the body 42 to the outside. In contrast, the lower weak part 54 is formed into the curved surface by the round part 56 (see FIG. 4). Accordingly, the lower weak part 54 has a lower rigidity than the upper strong part 52.

(3) Operation of the Vehicle Operation Pedal Device at a Stepping Operation

In the vehicle operation pedal device 10 according to the present embodiment, the operation pedal 80 circularly moves to the vehicle front side around the rotational center point 110 (i.e. the boss 88 of the operation pedal 80) at the stepping operation when the depressing part 84 of the operation pedal 80 is stepped on to the vehicle front side at a normal time. In contrast, when the stepping operation to the operation pedal 80 is released, the operation pedal 80 circularly moves to the vehicle rear side around the rotational center point 110 (i.e. the boss 88 of the operation pedal 80) by a biasing force of a biasing member (not illustrated).

At that time, the load F1 acting on the rotation bolt B (i.e. the boss 88 of the operation pedal 80) is received by the pair of upper support members 20L, 20R and the pair of lower support members 40L, 40R at the both sides of the operation pedal 80 in the vehicle width direction. Specifically, the load F1 is mainly received by the stopper parts 32 of the escape holes 30 of the upper support member 20. Also, the load F1 is auxillary received by the rotation holes 48 of the lower support member 40.

Further, in the vehicle operation pedal device 10 according to the present embodiment, as described above, a direction of the first straight line L1 that connects the position where the pair of upper support members 20L, 20R is fixed to the dash panel 100 (i.e. the upper fixed point 38) to the rotational center point 110 of the rotation bolt B (i.e. the boss 88 of the operation pedal 80 etc.) is the same as a direction of the load F1 at the stepping operation. Accordingly, the boss 88 of the operation pedal 80 is efficiently and rotatably supported since at the stepping operation, the load F1 acting on the rotation bolt B (i.e. the boss 88 of the operation pedal 80) does not generate a rotation moment and is received 2 by the pair of upper support members 20L, 20R and the pair of lower support members 40L, 40R. Therefore, in the vehicle operation pedal device 10 according to the present embodiment, each cross section of the pair of upper support members 20L, 20R and the pair of lower support members 40L, 40R to receive the load F1 at the depressing operation is made minimum, thereby being able to reduce the weight and the costs.

Incidentally, when the operating rod R is displaced toward the vehicle front side according to the stepping operation to the operation pedal 80, an operation force at the stepping operation is transmitted to a braking device or a control device to control a driving state of the vehicle through a hydraulic circuit or an electronic circuit etc.

Figure 6:
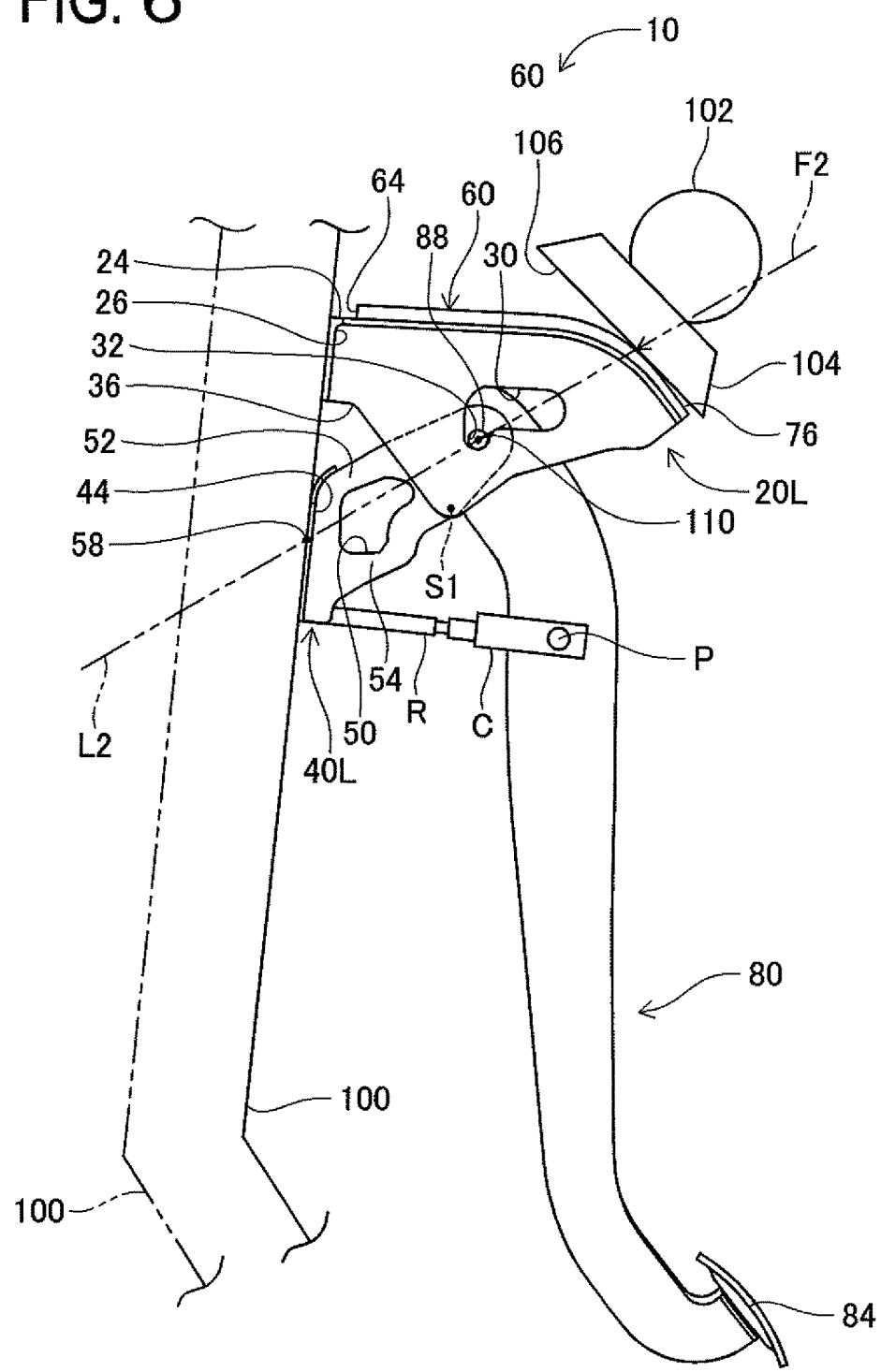
FIG. 6 is a side view illustrating the configuration of the vehicle operation pedal device at a time of vehicle collision without a rotation bolt, a nut, a collar, and a bush etc.

(4) Operation of the Vehicle Operation Pedal Device at a Time of Vehicle Collision As illustrated in FIG. 6, in the vehicle operation pedal device 10 according to the present embodiment, when the dash panel 100 is displaced toward the vehicle rear side at the time of vehicle collision, the sliding receiving part 76 of the upper center support member 60 may be abutted on the sliding surface 106 of the instrument panel reinforcement 102 disposed on the vehicle rear side relative to the dash panel 100.

Figure 7:
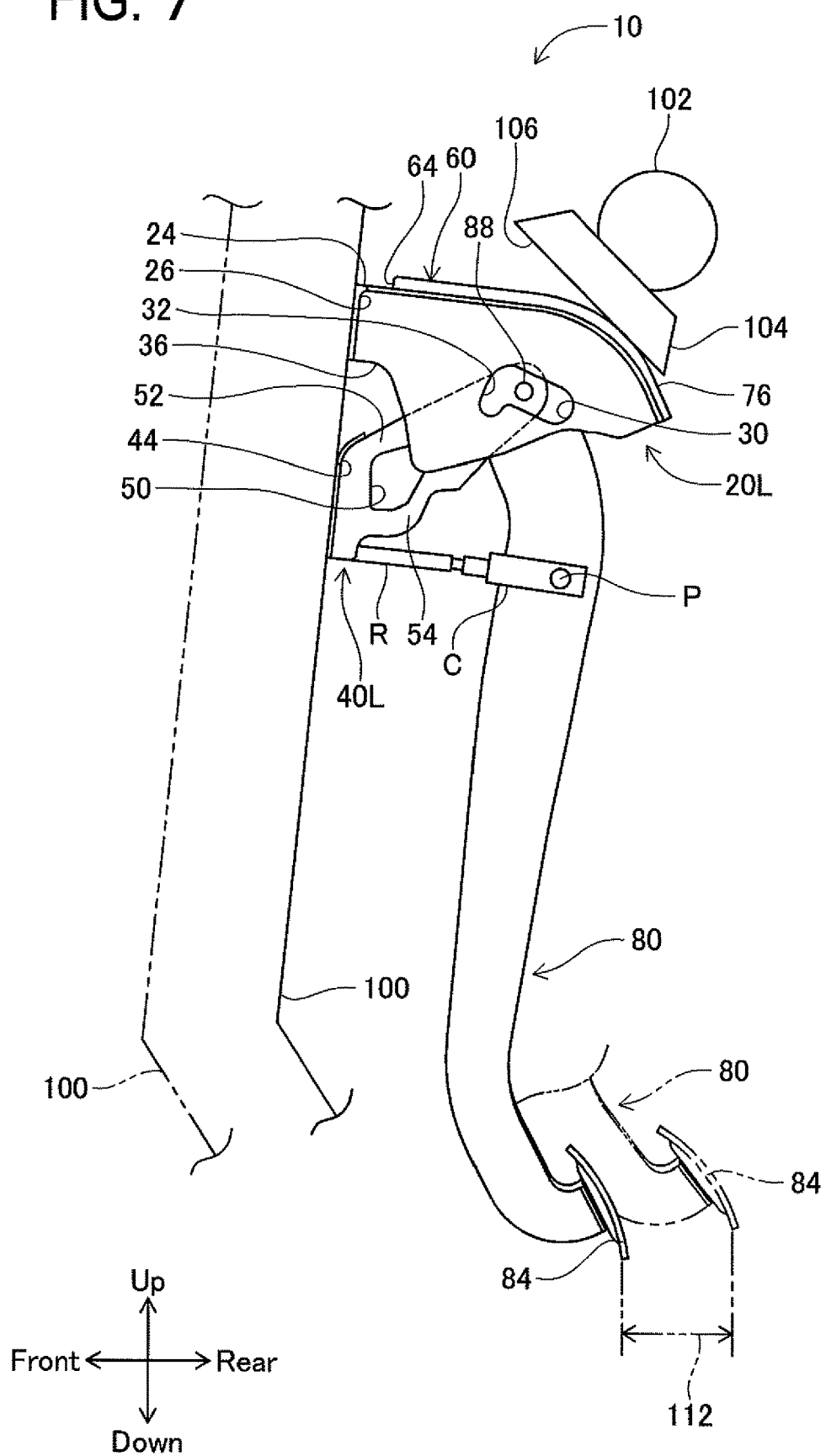
FIG. 7 is a side view illustrating the configuration of the vehicle operation pedal device at the time of vehicle collision without the rotation bolt, the nut, the collar, and the bush etc.

In that case, as illustrated in FIG. 7, the sliding receiving part 76 of the upper center support member 60 slides on the sliding surface 106 of the instrument panel reinforcement 102 to be guided to the vehicle lower side as it goes toward the vehicle rear side. Further, since the pair of lower support members 40L, 40R has a weaker strength than the pair of upper support members 20L, 20R, the pair of lower support members 40L, 40R is buckled and deformed. In response to the buckling deformation, the boss 88 of the operation pedal 80 rotatably supported by the rotation holes 48 of the pair of lower support members 40L, 40R is guided to the vehicle rear side from the stopper parts 32 inside the escape holes 30 of the pair of upper support members 20L, 20R.

Accordingly, the boss 88 of the operation pedal 80, while moving toward the vehicle rear side, pivots toward the vehicle lower side by the rotation moment in which a center is the connection pin P rotatably supporting the tip part of the operating rod R with respect to the operation pedal 80. Thereby, the depressing part 84 of the operation pedal 80 moves toward the vehicle front side. Accordingly, the depressing part 84 of the operation pedal 80 moves to, for instance, a position an advancing distance 112 away toward the vehicle front side from a state where the depressing operation is released (i.e. the depressing part 84 of the operation pedal 80 indicated by a two-dot chain line). Thereby, the depressing part 84 of the operation pedal 80 is prevented from moving rearward at the time of vehicle collision.

As described above, in the vehicle operation pedal device 10 according to the present embodiment, the depressing part 84 of the operation pedal 80 is stably prevented from moving rearward at the time of vehicle collision with a simple structure, and further the operation pedal 80 positively pivots at the stepping operation as described above. Therefore, in the vehicle operation pedal device 10 according to the present embodiment, the number of parts needful to prevent the depressing part 84 of the operation pedal 80 from moving rearward at the time of vehicle collision are small, and a space-saving is achieved since a mounting space in a vehicle vertical direction is small. Accordingly, the vehicle operation pedal device 10 according to the present embodiment can further reduce the weight and costs, and thus the case where a mounting space is insufficient due to a vehicle design is decreased.

And, in the vehicle operation pedal device 10 according to the present embodiment, a direction of the second straight line L2 that connects a position where the pair of lower support members 40L, 40R is fixed to the dash panel 100 (i.e. the lower fixed point 58) to the rotational center point 110 of the rotation bolt B (i.e. the boss 88 of the operation pedal 80 etc.) is the same as a direction of the reaction force F2 that the sliding receiving part 76 of the upper center support member 60 receives from the sliding surface 106 of the instrument panel reinforcement 102 at the time of vehicle collision. Accordingly, the pair of lower support members 40L, 40R is efficiently buckled and deformed, since at the time of vehicle collision, the reaction force F2 acting on the sliding receiving part 76 of the upper center support member 60 does not generate a rotation moment and is received by the pair of upper support members 20L, 20R and the pair of lower support members 40L, 40R. Thereby, in the vehicle operation pedal device 10 according to the present embodiment, each cross section of the pair of upper support members 20L, 20R and the pair of lower support members 40L, 40R to receive the reaction force F2 at the time of vehicle collision is made minimum, thereby being able to further reduce the weight and the costs.

And, in the vehicle operation pedal device 10 according to the present embodiment, the pair of lower support members 40L, 40R includes the upper strong part 52 provided on the vehicle upper side relative to the second straight line L2 and the lower weak part 54 provided on the second straight line L2 and on the vehicle lower side relative to the second straight line L2. As described above, the lower weak part 54 has a lower rigidity than the upper strong part 52. Further, the lower weak part 54 is formed in the round part 56 being the curved surface protruding inside (see FIG. 4). Therefore, since in the pair of lower support members 40L, 40R at the time of vehicle collision, the lower weak part 54 is easier to be buckled and deformed than the upper strong part 52, the boss 88 of the operation pedal 80 positively pivots toward the vehicle lower side while moving toward the vehicle rear side. Accordingly, in the vehicle operation pedal device 10 according to the present embodiment, the depressing part 84 of the operation pedal 80 is positively prevented from moving rearward at the time of vehicle collision.

In the pair of lower support members 40L, 40R, when the lower weak part 54 is buckled and deformed, the plate shaped part from the lower peripheral edge of the opening part 50 to the lower edge of the body 42 is buckled by the round part 56 (see FIG. 4) while moving inside the pair of lower support members 40L, 40R.

Figure 8:
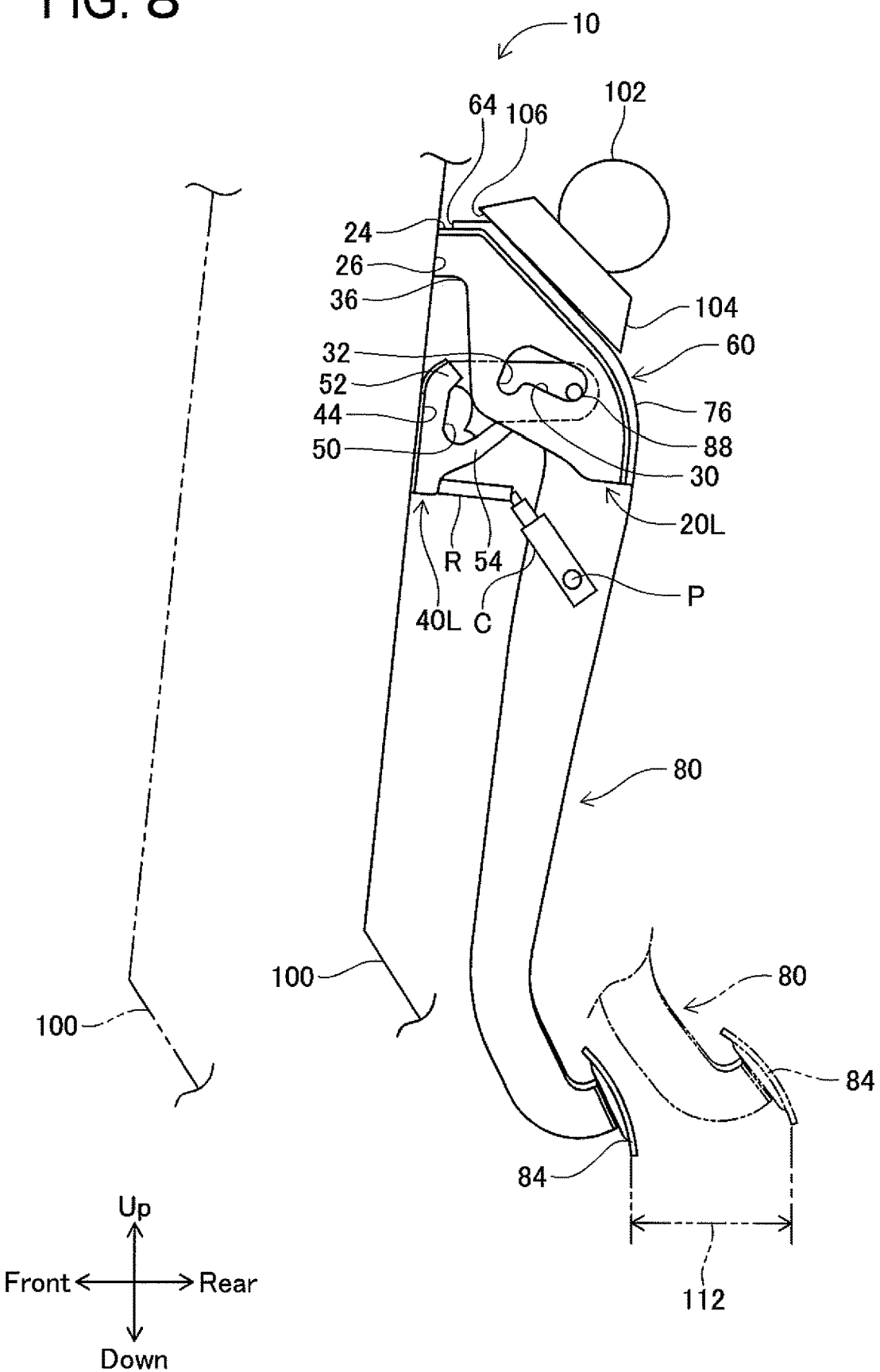
FIG. 8 is a side view illustrating the configuration of the vehicle operation pedal device at the time of vehicle collision without the rotation bolt, the nut, the collar, and the bush etc.

In addition, as illustrated in FIG. 8, when the dash panel 100 is further displaced toward the vehicle rear side at the time of vehicle collision, the plate shaped part from the lower peripheral edge of the opening part 50 to the lower edge of the body 42 is broken in the lower weak part 54 of the pair of lower support members 40L, 40R, thereby increasing the advancing distance 112 of the depressing part 84 of the operation pedal 80.

And, in the vehicle operation pedal device 10 according to the present embodiment, the pair of lower support members 40L, 40R is fixed to the pair of upper support members 20L, 20R by spot welding at the position adjacent to the lower weak part 54 (i.e. the spot welding point S1) from a side where the sliding receiving part 76 of the upper center support member 60 receives the reaction force F2 at the time of vehicle collision (i.e. the vehicle upper side). Accordingly, in the pair of lower support members 40L, 40R, the reaction force F2 at the time of vehicle collision acts on the lower weak part 54 through the upper center support member 60, the pair of upper support members 20L, 20R, and the spot welding point S1. At that time, since the reaction force F2 at the time of vehicle collision concentrically acts on one point inside the lower weak part 54 through the spot welding point S1, the lower weak part 54 is positively buckled and deformed at the time of vehicle collision. Accordingly, in the vehicle operation pedal device 10 according to the present embodiment, the depressing part 84 of the operation pedal 80 is more positively prevented from moving rearward at the time of vehicle collision.

And, in the vehicle operation pedal device 10 according to the present embodiment, the pair of upper support members 20L, 20R includes the stopper part 32. As described above, the stopper part 32 is configured so that one part of the peripheral edge of the escape hole 30 protrudes the down direction and holds the boss 88 of the operation pedal 80 at the stepping operation by the rotation bolt B being engaged. Therefore, in the pair of upper support members 20L, 20R at the stepping operation, the load F1 acting on the boss 88 of the operation pedal 80 is positively received by the stopper parts 32 through the rotation bolt B. Accordingly, in the vehicle operation pedal device 10 according to the present embodiment, a state where the boss 88 of the operation pedal 80 rotates at the stepping operation is positively maintained.

And, in the vehicle operation pedal device 10 according to the present embodiment, the front end 64 of the upper center support member 60 is disposed on the vehicle rear side relative to the dash panel 100. Further, the pair of upper support members 20L, 20R includes the bent part 36 having the lower edge directed to the vehicle lower side as it goes toward the vehicle rear side. Namely, the bent part 36 is provided at the position directed from the front end 64 of the upper center support member 60 to the vehicle lower side. Therefore, the pair of upper support members 20L, 20R at the time of vehicle collision is deformed so as to be directed toward the vehicle lower side as it goes toward the vehicle rear side with the bent part 36 as a starting point between the dash panel 100 and the front end 64 of the upper center support member 60. Accordingly, since in the vehicle operation pedal device 10 according to the present embodiment, the boss 88 of the operation pedal 80 rotatably supported by the rotation holes 48 of the pair of lower support members 40L, 40R is easy to lead from the stopper parts 32 toward the vehicle rear side inside the escape holes 30 of the pair of upper support members 20L, 20R, the depressing part 84 of the operation pedal 80 is more positively prevented from moving rearward at the time of vehicle collision.

(5) Others

Although one embodiment of the present disclosure has been described in detail, it should be understood that the various changes, substitutions, and alterations could be made hereto without departing from the spirit and scope of the disclosure.

Figure 9:
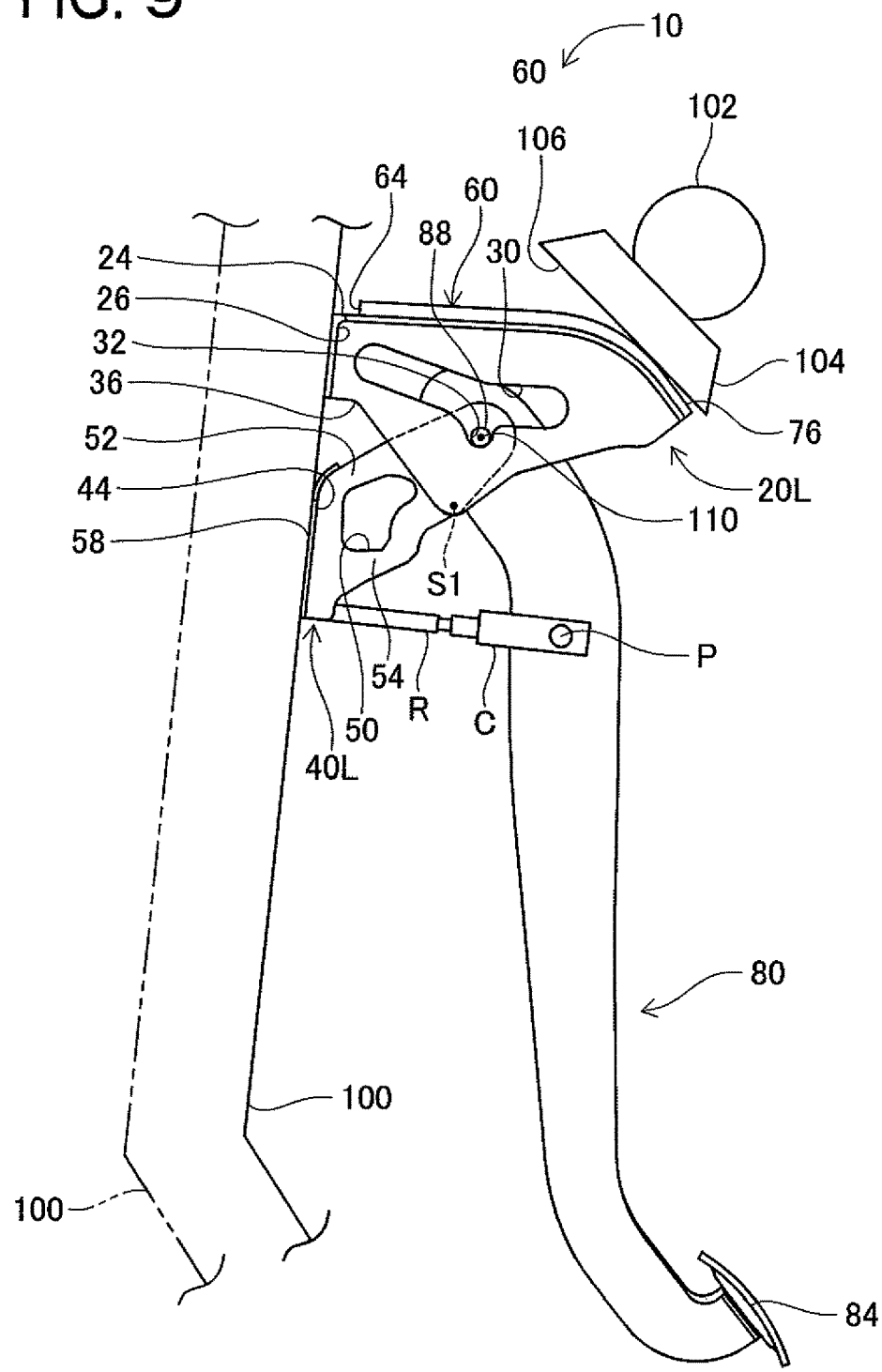
FIG. 9 is a side view illustrating a variation of the configuration of the vehicle operation pedal device.

For example, as illustrated in FIG. 9, the escape hole 30 of the upper support member 20 may be extended to between the front end 64 of the upper center support member 60 and the bent part 36 of the upper support member 20. In that case, the upper support member 20 at the time of vehicle collision is much easier to be deformed with the bent part 36 as the starting point.

Alternatively, as illustrated in FIG. 10, in the upper support member 20, a through hole 114 may be provided between the front end 64 of the upper center support member 60 and the bent part 36 of the upper support member 20. Even in that case, the upper support member 20 at the time of vehicle collision is much easier to be deformed with the bent part 36 as the starting point.

And, in the lower weak part 54 of the pair of lower support members 40L, 40R, the rigidity of the lower weak part 54 may be lower than the upper strong part 52 by making plate thickness of the plate shaped part from the lower peripheral edge of the opening part 50 to the lower edge of the body 42 thinner than plate thickness of the upper strong part 52.

Alternatively, in the lower weak part 54 of the pair of lower support members 40L, 40R, the rigidity of the lower weak part 54 may be lower than the upper strong part 52 by providing a cut-out recessed part in the plate shaped part from the lower peripheral edge of the opening part 50 to the lower edge of the body 42.

And, in the lower weak part 54 of the pair of lower support members 40L, 40R, the second straight line L2 may be disposed on the plate shaped part from the lower peripheral edge of the opening part 50 to the lower edge of the body 42. In that case, the pair of lower support members 40L, 40R is more efficiently buckled and deformed.

Incidentally, even if the second straight line L2 is not disposed on the rotational center point 110 of the rotation bolt B (i.e. the boss 88 of the operation pedal 80 etc.), the pair of lower support members 40L, 40R can be efficiently buckled and deformed as long as the second straight line L2 is disposed on the lower weak part 54 of the pair of lower support members 40L, 40R.

And, although in the present embodiment, the present disclosure is applied with the operation pedal 80 as a brake pedal, the present disclosure may be applied to each pedal used for a vehicle (for example, an accelerator pedal or a clutch pedal etc.).

The following description is the list of aspects of the embodiments of the present application.

The first vehicle operation pedal device is a vehicle operation pedal device including an operation pedal provided with a boss at an upper end part and further provided with a depressing part at a lower end part, the depressing part to be stepped on to a vehicle front side; a pair of upper support members fixed to a first vehicle component member disposed on the vehicle front side relative to the operation pedal and received a load acting on the boss of the operation pedal at a stepping operation at both sides of the operation pedal in a vehicle width direction by stepping on the depressing part of the operation pedal to the vehicle front side at a normal time; a pair of lower support members fixed to the first vehicle component member and further fixed to the pair of upper support members at the both sides of the operation pedal in the vehicle width direction, the pair of lower support members configured to be rotatably supported the boss of the operation pedal while receiving the load at the stepping operation at the both sides of the operation pedal in the vehicle width direction and further configured to be a weaker strength than the pair of upper support members; an upper center support member laid between upper end parts of the pair of upper support members; and a support part pivotably supporting a tip part of an operating rod protruded toward a vehicle rear side from the first vehicle component member with respect to the operation pedal between the upper end part and the lower end part of the operation pedal, wherein the upper center support member includes a sliding receiving part configured to be faced a sliding surface provided so as to incline toward a vehicle lower side as it goes toward the vehicle rear side in a second vehicle component member disposed on the vehicle rear side relative to the first vehicle component member, and wherein the pair of upper support members includes an escape hole for which the boss of the operation pedal is led to the vehicle rear side in response to being guided the sliding receiving part of the upper center support member by sliding on the sliding surface of the second vehicle component member and buckling deformation of the pair of lower support members when the first vehicle component member is displaced toward the vehicle rear side at a time of vehicle collision, and wherein the boss of the operation pedal pivots toward the vehicle lower side around the support part while moving to the vehicle rear side when the first vehicle component member is displaced toward the vehicle rear side at the time of vehicle collision.

The second vehicle operation pedal device is the first vehicle operation pedal device, wherein a direction of a first straight line connecting a position where the pair of upper support members is fixed to the first vehicle component member to the boss of the operation pedal is the same as a direction of the load at the stepping operation.

The third vehicle operation pedal device is the first vehicle operation pedal device, wherein a direction of a second straight line connecting a position where the pair of lower support members is fixed to the first vehicle component member to the boss of the operation pedal is the same as a direction of a reaction force that the sliding receiving part of the upper center support member receives from the sliding surface of the second vehicle component member at the time of vehicle collision.

The fourth vehicle operation pedal device is the second vehicle operation pedal device, wherein a direction of a second straight line connecting a position where the pair of lower support members is fixed to the first vehicle component member to the boss of the operation pedal is the same as a direction of a reaction force that the sliding receiving part of the upper center support member receives from the sliding surface of the second vehicle component member at the time of vehicle collision.

The fifth vehicle operation pedal device is the third vehicle operation pedal device, wherein the pair of lower support members includes: an upper strong part provided on a vehicle upper side relative to the second straight line; and a lower weak part provided on the second straight line or on the vehicle lower side relative to the second straight line and configured to be a lower rigidity than the upper strong part.

The sixth vehicle operation pedal device is the fifth vehicle operation pedal device, wherein the pair of lower support members is fixed to the pair of upper support members by spot welding at a position adjacent to the lower weak part from a side where the sliding receiving part of the upper center support member receives the reaction force at the time of vehicle collision.

The seventh vehicle operation pedal device is the first vehicle operation pedal device, wherein the pair of upper support members include a stopper part that is a part of a peripheral edge of the escape hole and to hold the boss of the operation pedal at the stepping operation.

The eighth vehicle operation pedal device is the first vehicle operation pedal device, wherein a front end of the upper center support member is positioned on the vehicle rear side relative to the first vehicle component member, wherein the pair of upper support members includes a bent part that a lower edge directed toward the vehicle lower side as it goes toward the vehicle rear side, and wherein the bent part is provided at a position directed from the front end of the upper center support member toward the vehicle lower side.

The vehicle operation pedal device of the disclosure is completed mounting to a vehicle by being fixed to the first vehicle component member disposed on the vehicle front side relative to the operation pedal, and wherein the number of parts needful to prevent the depressing part of the operation pedal from moving rearward at the time of vehicle collision are small, and wherein the mounting space in the vehicle vertical direction is small.

Incidentally, in the present embodiment, the upper fixed point 38 is one example of "a position where a pair of upper support members is fixed to a first vehicle component member". The lower fixed point 58 is one example of "a position where a pair of lower support members is fixed to the first vehicle component member". The dash panel 100 is one example of "the first vehicle component member". The instrument panel reinforcement 102 and the bracket for collision 104 are one example of "a second vehicle component member". The spot welding point S1 is one example of "a position adjacent to a lower weak part on an upper center support member side". The connection hole 86 of the connection pin P is one example of "a support part".

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A vehicle operation pedal device comprising:
   an operation pedal provided with a boss at an upper end part and further provided with a depressing part at a lower end part, the depressing part being configured to be depressed in a direction towards a vehicle front side;
   a pair of upper support members fixed to a first vehicle component member disposed on the vehicle front side relative to the operation pedal, the pair of upper support members being configured to receive a load acting on the boss at both sides of the operation pedal in a vehicle width direction when the depressing part of the operation pedal is depressed in the direction towards the vehicle front side in a non-collision state;
   a pair of lower support members fixed to the first vehicle component member and further fixed to the pair of upper support members at the both sides of the operation pedal in the vehicle width direction, the pair of lower support members being configured to rotatably support the boss of the operation pedal while receiving the load acting on the boss at the both sides of the operation pedal in the vehicle width direction and further being configured to include a weaker strength than the pair of upper support members;
   an upper center support member laid between upper end parts of the pair of upper support members; and
   a support part pivotably supporting a tip part of an operating rod protruded toward a vehicle rear side from the first vehicle component member with respect to the operation pedal between the upper end part and the lower end part of the operation pedal, wherein:
      the upper center support member includes a sliding receiving part configured to face a sliding surface of a second vehicle component disposed on the vehicle rear side relative to the first vehicle component member, the sliding surface extending in a direction toward the vehicle rear side so as to be inclined toward a vehicle lower side,
      the pair of upper support members include an escape hole that is configured to guide movement of the boss of the operation pedal toward the vehicle rear side in response to the sliding receiving part of the upper center support member sliding on the sliding surface of the second vehicle component member and buckling deformation of the pair of lower support members when the first vehicle component member is displaced toward the vehicle rear side at a time of vehicle collision, and
      the boss of the operation pedal is configured to pivot toward the vehicle lower side around the support part while moving to the vehicle rear side when the first vehicle component member is displaced toward the vehicle rear side at the time of vehicle collision.

2. The vehicle operation pedal device according to claim 1, wherein a direction of a first straight line connecting a position where the pair of upper support members are fixed to the first vehicle component member to the boss of the operation pedal is the same as a direction of the load acting on the boss when the depressing part of the operation pedal is depressed in the non-collision state.

3. The vehicle operation pedal device according to claim 2, wherein a direction of a second straight line connecting a position where the pair of lower support members are fixed to the first vehicle component member to the boss of the operation pedal is the same as a direction of a reaction force that the sliding receiving part of the upper center support member is configured to receive from the sliding surface of the second vehicle component member at the time of vehicle collision.

4. The vehicle operation pedal device according to claim 1, wherein a direction of a straight line connecting a position where the pair of lower support members are fixed to the first vehicle component member to the boss of the operation pedal is the same as a direction of a reaction force that the sliding receiving part of the upper center support member is configured to receive from the sliding surface of the second vehicle component member at the time of vehicle collision.

5. The vehicle operation pedal device according to claim 4, wherein the pair of lower support members include:
   an upper part provided on a vehicle upper side relative to the straight line; and
   a lower part provided on the straight line or on the vehicle lower side relative to the straight line and configured to include a lower rigidity than the upper part.

6. The vehicle operation pedal device according to claim 5, wherein the pair of lower support members are fixed to the pair of upper support members by spot welding at a position adjacent to the lower part from a side where the sliding receiving part of the upper center support member is configured to receive the reaction force at the time of vehicle collision.

7. The vehicle operation pedal device according to claim 1, wherein the pair of upper support members include a stopper part that is a part of a peripheral edge of the escape hole and is configured to hold the boss of the operation pedal when the depressing part of the operation pedal is depressed in the non-collision state.

8. The vehicle operation pedal device according to claim 1, wherein:
   a front end of the upper center support member is positioned on the vehicle rear side relative to the first vehicle component member,
   the pair of upper support members include a bent part including a lower edge that extends toward the vehicle rear side so as to be inclined towards the vehicle lower side, and
   the bent part is provided at a position directed from the front end of the upper center support member toward the vehicle lower side.

* * * * *